Oct. 13, 1925.
G. A. JENSEN
STORAGE BATTERY INDICATOR
Filed May 3, 1924
1,556,838
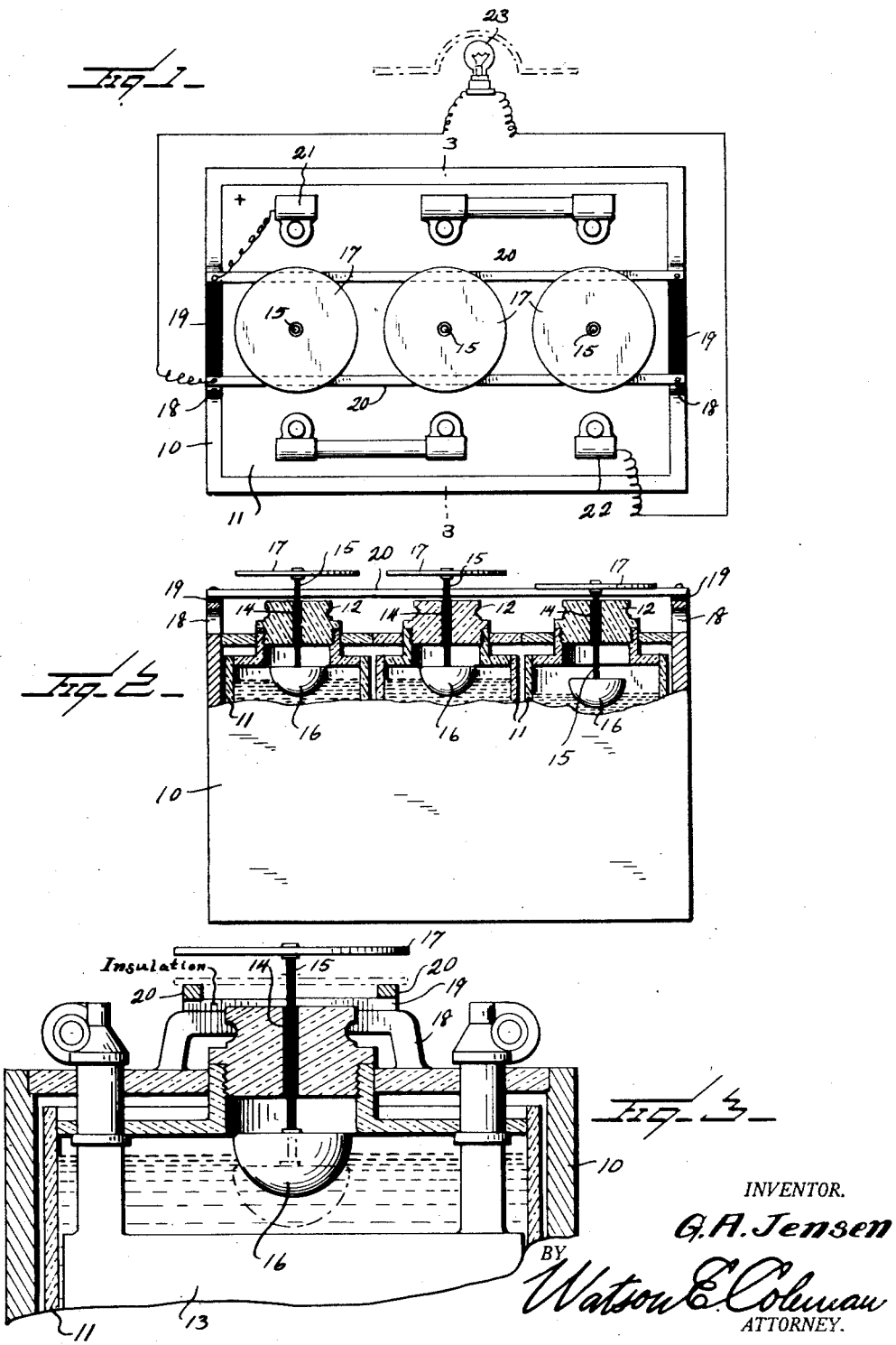
INVENTOR.
G. A. Jensen
BY Watson E. Coleman
ATTORNEY.

Patented Oct. 13, 1925.

1,556,838

UNITED STATES PATENT OFFICE.

GEORGE A. JENSEN, OF DENVER, COLORADO.

STORAGE-BATTERY INDICATOR.

Application filed May 3, 1924. Serial No. 710,859.

*To all whom it may concern:*

Be it known that I, GEORGE A. JENSEN, a citizen of the United States, residing at Denver, in the county of Denver and State of Colorado, have invented certain new and useful Improvements in Storage-Battery Indicators, of which the following is a specification, reference being had to the accompanying drawings.

This invention relates to fluid level indicators for storage batteries and more particularly to a device of such character adapted for use upon the storage batteries of vehicles, which are usually so placed as to be difficult of access and which are accordingly often neglected.

A further object of the invention is to provide a device of this character which may be applied to a storage battery without materially altering the present construction thereof, the alterations consisting merely in the formation of enlarged openings in the filling caps of the battery.

A still further object of the invention is to provide automatic means for indicating a dangerous low level of fluid within any cell of the battery.

These and other objects I attain by the construction shown in the accompanying drawings, wherein for the purpose of illustration is shown a preferred embodiment of my invention and wherein:—

Figure 1 is a plan view of a battery having a signaling system constructed in accordance with my invention, the connections of the signaling system being disclosed;

Figure 2 is a side elevation partially in section of the storage battery, showing the arrangement of the float;

Figure 3 is an enlarged section on the line 3—3 of Figure 1;

Referring now more particularly to the drawings, the numeral 10 generally indicates a battery case having arranged therein a plurality of cells 11 having the usual filling caps 12 by means of which fluid may be admitted to the cell. It is well known to those familiar with the art that when this fluid reaches a level below the electrodes 13 of any of the cells and the battery is operated for any appreciable period of time, while in this condition the cell is greatly injured or destroyed. In accordance with my invention, I form in each filling cap 12 an enlarged opening 14 through which I direct a stem 15 of insulating material having at its lower end a float 16 constructed of such material that it is not injured by the acid contents of the battery. The upper ends of these stems are provided with contact members 17 of any suitable conducting material which is preferably lead-coated to prevent its corrosion and destruction by the battery fumes.

It is well known to those familiar with the art that in the type of storage battery employed in automobiles these filling caps are usually aligned with one another and with handles 18 disposed at the ends of the battery case. The case and preferably the handles of the case are employed to support a pair of insulating mountings 19 upon which are mounted a pair of spaced rods 20 extending longitudinally of the battery and at opposite sides of the filling caps 12. One of these rods is connected to one terminal 21 of the storage battery, the other terminal 22 of the storage battery being connected to one terminal of an electric illuminating element 23 as indicated. The second rod 20 is connected to the other terminal of the illuminating element 23. It will be obvious that when the level within any of the cells lowers sufficiently to enable the head 17 of the stem 15 thereof to engage the rods 20, a connection will be made between these rods establishing a circuit between the terminals of the storage battery, which circuit includes the illuminating element with the result that this illuminating element will be rendered active and the operator of the vehicle apprised of the fact that in at least one cell of the battery the fluid level is dangerously lowered. Since operation of the illuminating element will be continued until this is corrected, no opportunity is given permitting the operator to forget this fact and accordingly liability of injury of the battery is greatly reduced. The rods 20 are preferably spaced apart a sufficient distance to enable removal of the caps 12 without disturbing the rods.

It will be obvious that the construction hereinbefore set forth is capable of a certain range of change and modification without materially departing from the spirit of my invention and I accordingly do not limit myself to such specific structure except as hereinafter claimed.

I claim:—

The combination with a storage battery having the usual cells, of a signal connected in an open circuit with the battery, and means operating upon a predetermined lowering of the levels of fluid in any of the cells of the battery for closing the circuit of said signal, comprising spaced bars extending longitudinally of the storage battery at opposite sides of the filling caps of the cells thereof, said caps having openings therein, floats arranged within each cell, an insulated bar connected with each float and extending through the opening of the cap, and a contact bar carried by each bar and adapted to connect the first named bars upon a predetermined lowering of the level of the liquid within the cell.

In testimony whereof I hereunto affix my signature.

GEORGE A. JENSEN.